United States Patent [19]

Nagashima

[11] Patent Number: 5,157,606
[45] Date of Patent: Oct. 20, 1992

[54] SYSTEM FOR TRANSLATION OF SOURCE LANGUAGE DATA INTO MULTIPLE TARGET LANGUAGE DATA INCLUDING MEANS TO PREVENT PREMATURE TERMINATION OF PROCESSING

[75] Inventor: Hironobu Nagashima, Mishima, Japan

[73] Assignee: Fujitsu Limited, Kawasaki, Japan

[21] Appl. No.: 492,971

[22] Filed: Mar. 13, 1990

[30] Foreign Application Priority Data

Mar. 13, 1989 [JP] Japan .................. 1-060076

[51] Int. Cl.$^5$ .............................. G06F 15/38
[52] U.S. Cl. ........................ 364/419; 395/146
[58] Field of Search .............. 364/200, 900, 417, 419, 364/148, 146

[56] References Cited

U.S. PATENT DOCUMENTS

| | | | |
|---|---|---|---|
| 3,603,937 | 9/1971 | Loizides et al. | 340/172.5 |
| 4,122,533 | 10/1978 | Kubinak | 364/900 |
| 4,130,882 | 12/1978 | Swanstrom et al. | 364/900 |
| 4,393,460 | 7/1983 | Masuzuma et al. | 364/900 |
| 4,412,305 | 10/1983 | Yoshida | 364/419 |
| 4,541,069 | 9/1985 | Kanou et al. | 364/900 |
| 4,593,356 | 6/1986 | Hashimoto et al. | 364/419 |
| 4,615,002 | 9/1986 | Innes | 364/419 |
| 4,623,985 | 11/1986 | Morimoto et al. | 364/419 |
| 4,654,798 | 3/1987 | Taki et al. | 364/419 |
| 4,688,192 | 8/1987 | Yoshimura et al. | 364/900 |
| 4,733,368 | 3/1988 | Morimoto et al. | 364/419 |
| 4,771,385 | 9/1988 | Egami et al. | 364/419 |
| 4,787,059 | 11/1988 | Yoshimura | 364/419 |
| 4,805,132 | 2/1989 | Okamoto et al. | 364/419 |
| 4,864,503 | 9/1989 | Tolin | 364/419 |
| 4,890,230 | 12/1989 | Tanoshima et al. | 364/419 |
| 4,903,206 | 2/1990 | Itoh et al. | 364/419 |
| 4,912,671 | 3/1990 | Ishida | 364/900 |
| 4,933,896 | 6/1990 | Sakai | 364/419 |
| 4,959,785 | 9/1990 | Yamamoto et al. | 364/419 |

OTHER PUBLICATIONS

"The Survey and Study of Language Translation by a Computer", Japanese Electronic Industries Institute, p. 22, Mar. 1983.

Primary Examiner—Gail O. Hayes
Attorney, Agent, or Firm—Staas & Halsey

[57] ABSTRACT

A multi-language conversion system is provided having a multi-language conversion table with a plurality of sub-tables for individual languages. These sub-tables include a keyword module for managing a keyword to be subject to a conversion in a predetermined sequence and a data module for storing translated data corresponding to the keyword in accordance with the order of the keywords and for storing default data. A multi-language conversion table selection unit selects at least one of the multiple language conversion sub-tables in accordance with a language conversion designation. A multi-language conversion module unit determines whether the language data subject to conversion exists in the keyword module, determines the translated data as a conversion data when the language data subject to conversion exists in the keyword module and determine default data as the conversion data when the language data subject to conversion does not exist in the keyword module.

9 Claims, 11 Drawing Sheets

PRIOR ART

```
A       DC  CL4' A'
        DC  AL4 (A)
        DC  CL4' B'
        DC  AL4 (B)
            .
            .
V       DC  CL4' Z'
Z       DC  AL4 (Z)
        DC  XL8' FFFFFFFFFFFFFFFF'
```

Fig. 9A

```
        DC  CL8' ACCNT'
        DC  CL8' ACDATE'
        DC  CL8' ACTIME'
            .
            .
        DC  CL8' VOLSER'
        DC  CL8' ZPINF'
        DC  XL8' FFFFFFFFFFFFFFFF'
```

Fig. 9B

```
        DC  AL4 (ACCNT)
        DC  AL4 (ACDATE)
        DC  AL4 (ACTIME)
            .
            .
        DC  AL4 (VOLSER)
        DC  AL4 (ZPINF)
        DC  XL8' FFFFFFFFFFFFFFFF'
```

Fig. 9C

```
         (JAPANESE)
ACCNT    DC   AL2 (14)
         DC   C'アクセス回数'
ACDATE   DC   AL2 (12)
         DC   C'アクセス日'
ACTIME   DC   AL2 (14)
         DC   C'アクセス時刻'
              .
              .
VOLSER   DC   AL2 (20)
         DC   C'ボリューム通し番号'
ZPINF    DC   AL2 (12)
         DC   C'ZAP情報'
```

Fig. 9D

```
         (ENGLISH)
ACCNT    DC   AL2 (12)
         DC   C'ACCESS  COUNT'
ACDATE   DC   AL2 (11)
         DC   C'ACCESS  DATE'
ACTIME   DC   AL2 (11)
         DC   C'ACCESS  TIME'
              .
              .
VOLSER   DC   AL2 (6)
         DC   C'VOLUME'
ZPINF    DC   AL2 (15)
         DC   C'ZAP  INFORMATION
```

Fig. 9E

SYSTEM FOR TRANSLATION OF SOURCE LANGUAGE DATA INTO MULTIPLE TARGET LANGUAGE DATA INCLUDING MEANS TO PREVENT PREMATURE TERMINATION OF PROCESSING

BACKGROUND OF THE INVENTION

1. Technical Field

The present invention relates to a multi-language conversion system in a data processing program, for connecting data based on a description of corresponding data expressed in a designated language, and for displaying the converted data on a display surface, and more particularly to a multi-language conversion system in a data processing apparatus for simply and adequately dealing with new subject data for conversion by adding an expansion function to the data processing program.

2. Description of the Related Art

The data processing apparatus is provided with a multi-language conversion system for displaying data described in the program in a desired language. This system can be used when the data processing apparatus is used in a country other than the one in which it is manufactured. The data processing apparatus is subjected to sequential program upgradings. Therefore, the data of a new subject for conversion must be added through an expansion function of the program to implement the multi-language processing system, and it is necessary to provide a means by which data can be simply and adequantly added.

Figure 1A:
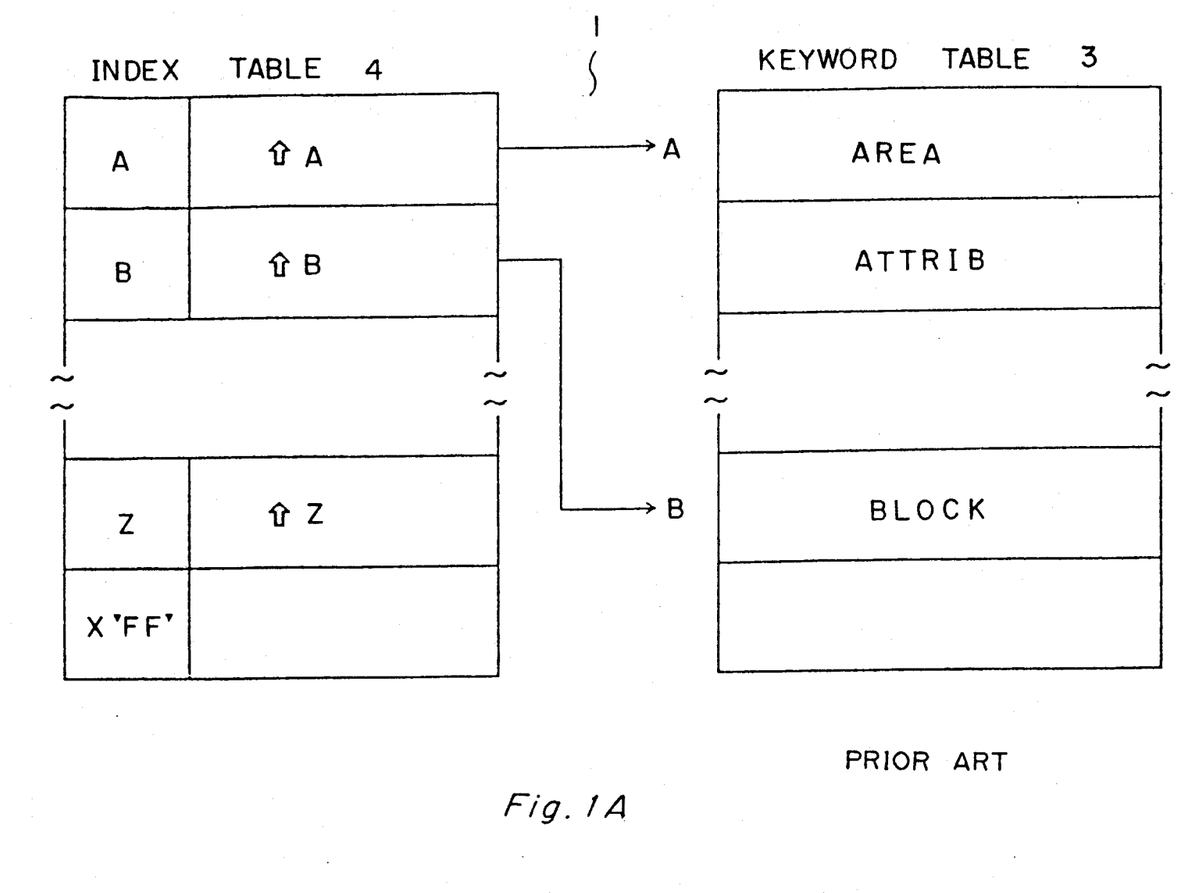
FIGS. 1A and 1B show an explanatory view of a keyword module and data module.
Figure 1B:
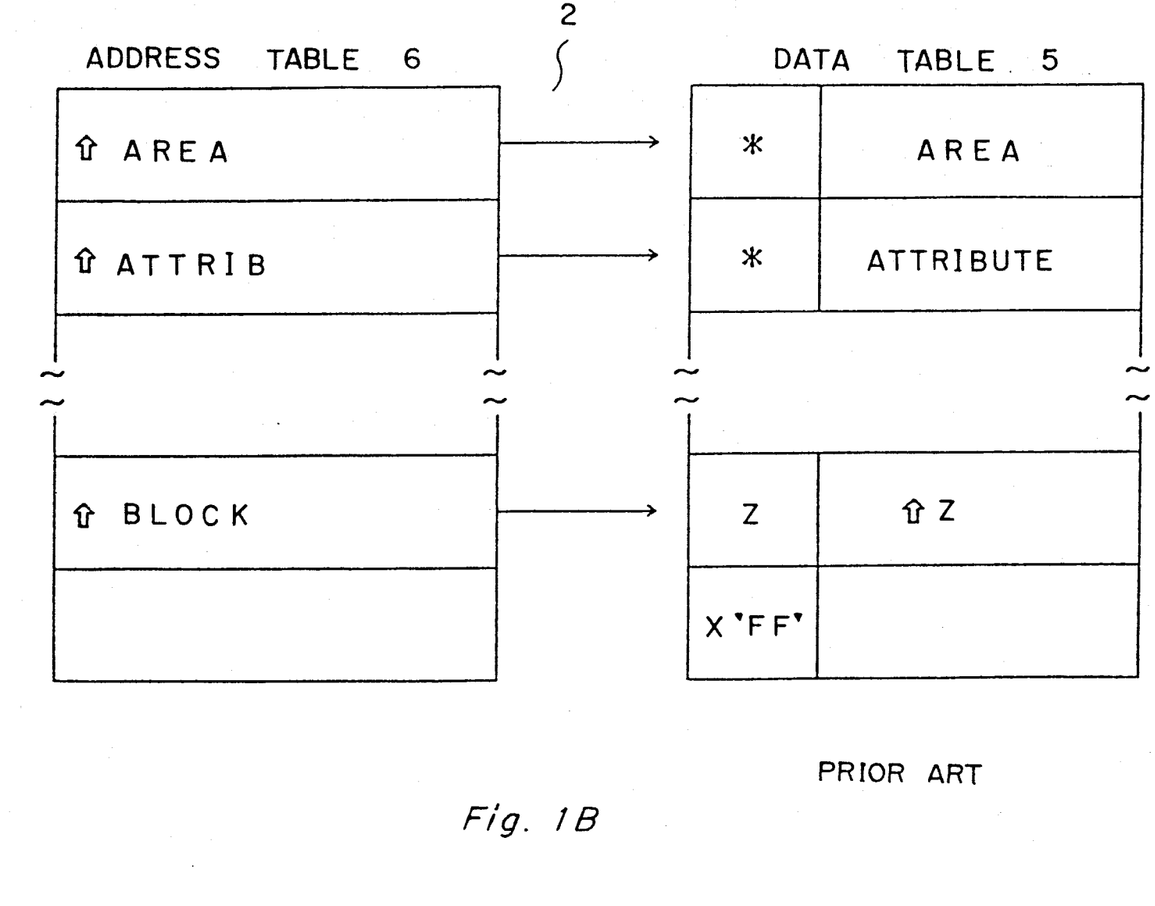

In order to implement a multi-language processing system, the data (called keyword hereafter) which is subject to a conversion is classified in accordance with a group of head characters. Thus, as shown in FIG. 1A, it is necessary to provide a keyword module 1 comprising a keyword table 3 for managing the head characters in incrementing order (or decrementing order) and an index table 4 for processing the head position of respective groups. It is also necessary to provide data module 2 comprising data table 5 for managing the data (the converted data of the keywords expressed in a designated language) corresponding to the keywords, in accordance with the same sequence as in keyword table 3. Also provided is address table 6 for processing the data corresponding to data table 5, as shown in FIG. 1B. This table assumes the Japanese language, and the data length information is stored in an area designated by (*).

Figure 2:
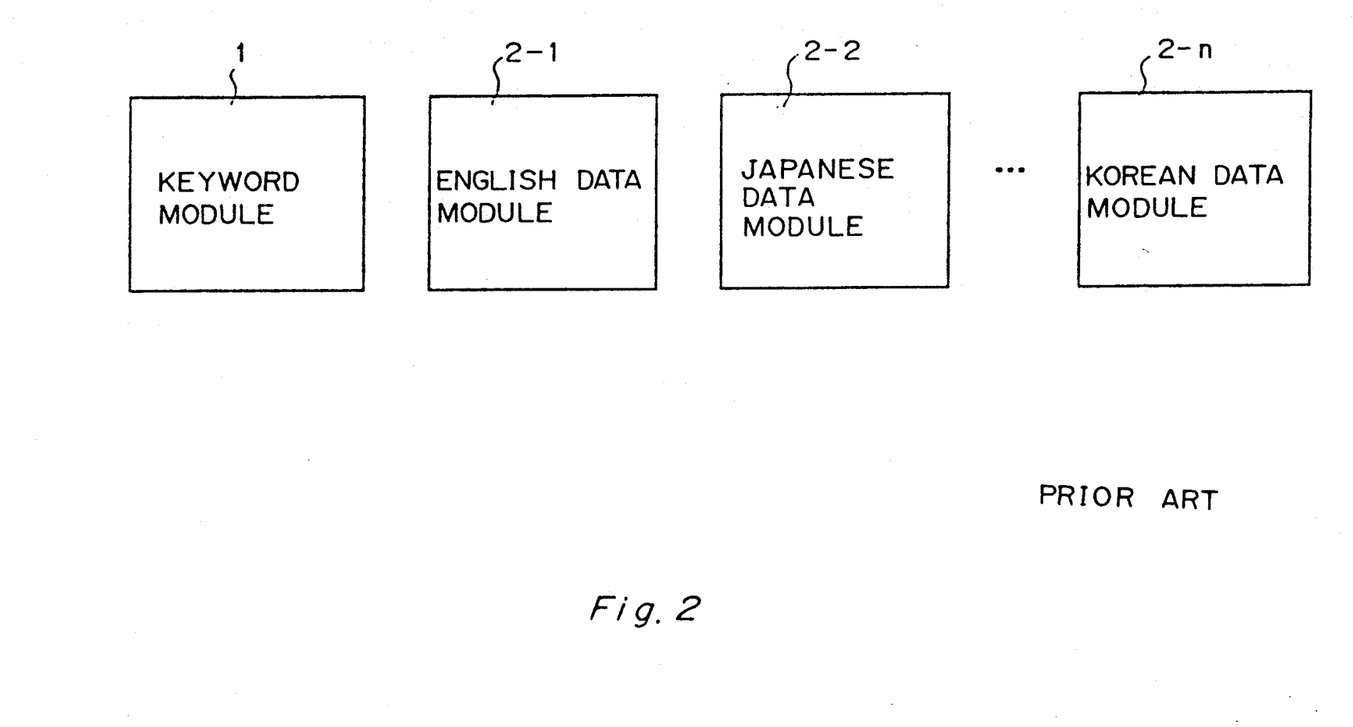
FIG. 2 shows a conversion table of the prior art multi-language conversion process system.

In prior art multi-language conversion processing systems, the keyword module 1 is formed and managed so that it is incorporated in a portion of the data conversion structure unit and carries out data conversion in accordance with a format applied to all the data modules 2 prepared for respective languages of a conversion subject. Thus, as shown in FIG. 2, keyword module 1 is constructed to be managed in a format such that it becomes common to data module 2 prepared for the respective language of a conversion subject. The order of keywords in keyword table 3 naturally complies with the order of the corresponding data stored in address table 6 with regard to the storing address.

Therefore, according to the structure of the prior art, where a keyword of a new subject for conversion is added to the keyword module, it is necessary to update data module 2 prepared for a language so that it corresponds to the added keyword in keyword module 1. If data module 2 is not updated, it does not comply with the sequential order of the keywords of keyword module 1, and thus returns wrong corresponding data. Further, it may perform an abnormal program end by failing to return the corresponding data. However, simultaneous execution of the updating process for all the data module 2 must create an extremely large load.

Therefore, in order to guarantee a normal conversion process at a portion other than the added keyword, that is, to guarantee the normal keyword conversion process managed up to this time, a method of adding the keyword to be added to the last portion of keyword table 3 is used. For example, as explained by the example shown in FIG. 1A, the keyword to be added enters a group of head character "Z", and keyword modules 1 and 2 are updated.

However, if the method described above is used, a keyword which does not have "Z" as its head character, has to be changed to a word starting with "Z", such as "Z-COPY". This causes the problem that a keyword with a nonsensical meaning must be added. Further, keywords belonging to the "Z" group become progressively longer. Thus, they generally have lower conversion capability than those belonging to other groups.

SUMMARY OF THE INVENTION

An object of the present invention is to provide a multi-language conversion process for converting keywords recited in the data processing program to corresponding data of the designated language, thereby simply and adequately dealing with situations in which new keywords are added and expanding the function of the program.

The present invention resides in a multi-language conversion system comprising multi-language conversion table means with respect to individual languages for storing a keyword module for managing a first language data to be a subject of a conversion in a predetermined sequence; a data module for storing second language data corresponding to said first language data in accordance with the order of the first language data stored in the keyword module and default data corresponding to data which does not belong to said first data; a multi-language conversion table selection means for selecting at least one of the multi-language conversion table means in accordance with the language designation; and a multi-language conversion module for determining whether the language data to be the subject of the conversion in accordance with the selected language conversion table exists in the first language data, for determining said second language data as a conversion data when said language data to be a subject of a conversion exists in the first language data, and for determining the default data as the conversion data when said language data to be a subject of a conversion does not exist in the first language data.

DETAILED DESCRIPTION OF THE PREFERRED EMBODIMENT

Figure 3:
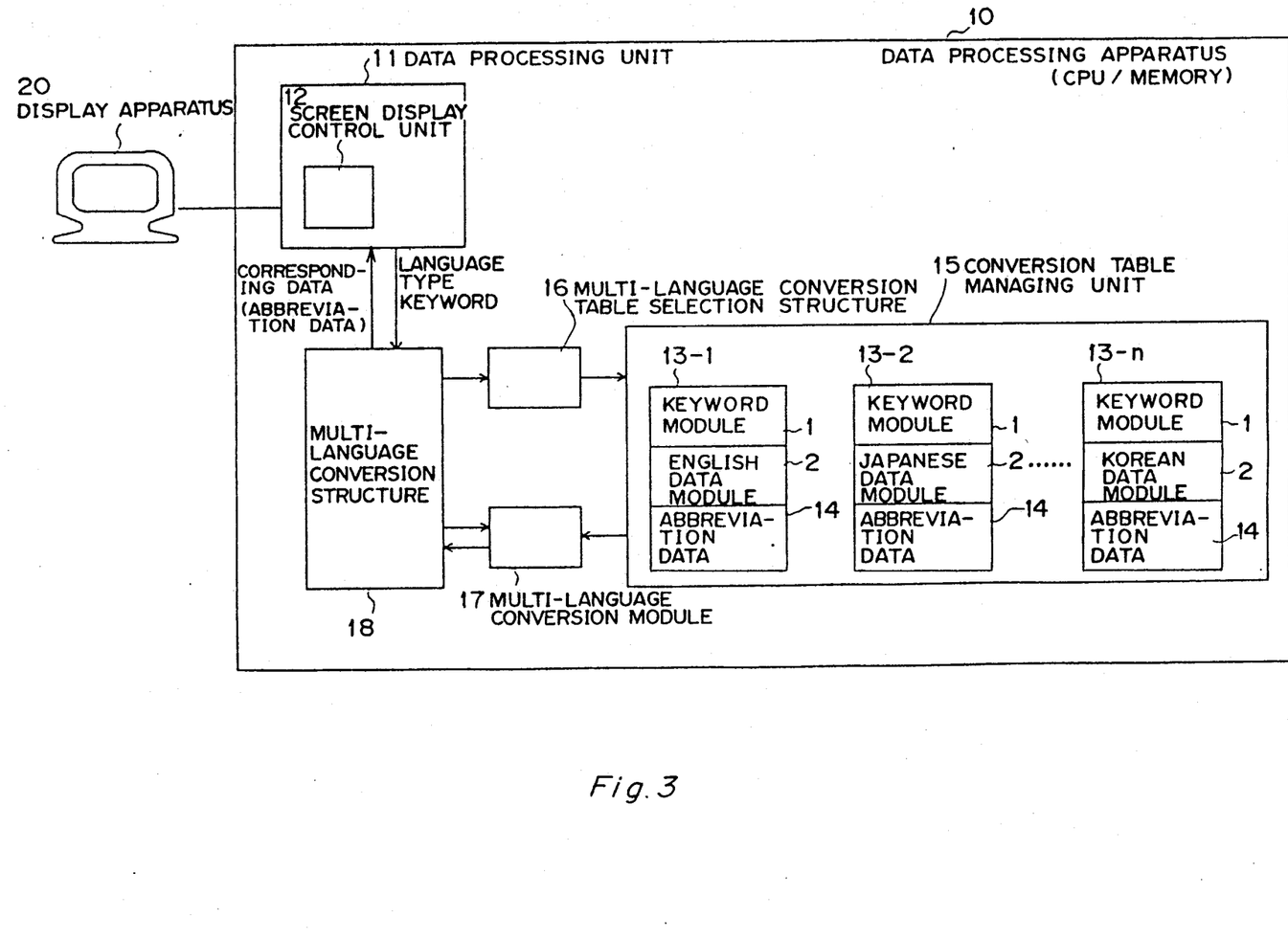
FIG. 3 shows a structural diagram for explaining the principle of the present invention.

FIG. 3 shows the principle structure of the present invention. Keyword module 1 and data module 2 are explained by referring to FIGS. 1A and 1B. Data processing apparatus 10 is equipped with the present invention. Display apparatus 20 represents a display screen and data process unit 11 carries the processing program. Screen display control unit 12 is provided in data processing apparatus 10 and displays a keyword of a conversion subject described in the data processing program on the display screen. Language conversion tables 13-1, 13-2 through 13-n are formed for respective desired languages into which data is to be converted, by unifying keyword module 1 with data module 2 and is structured to manage predetermined default data 14. Conversion table management unit 15 manages a plurality of prepared language conversion tables. Multi-language conversion table selection structure 16 selects one of the language conversion tables 13-1, 13-2 through 13-n relating to a particular language from conversion table management unit 15 when the language used for the data conversion is designated. A multi-language conversion module 17 converts the keyword to the corresponding data expressed by the designated language by the selected one of the language conversion tables 13-1, 13-2 through 13-n. Multi-language conversion tables 13-1, 13-2 through 13-n do not have the corresponding data in the conversion process, abbreviated data 14 is treated as the corresponding data. Multi-language conversion structure 18 is activated by data processing unit 11 and controls a calling of multi-language conversion structure 16 and multi-language conversion module 17.

When data processing unit 11 displays a keyword in a data processing program using the corresponding data expressed in a predetermined language on the display screen, the language type and keyword (designated by a code) is provided to activate multi-language conversion structure 18. Multi-language conversion structure 18 then designates the provided language type to call multi-language conversion table selection structure 16. Multi-language conversion selection table selection structure 16 then reads one of the language conversion tables 13-1, 13-2 through 13-n of the language designated by conversion table management unit 15, and selects this language conversion table as the one to be utilized by multi-language conversion module 17.

Following the above step, multi-language conversion structure 18 calls multi-language conversion module 17 by designating the provided keyword. Multi-language conversion module 17 then searches keyword module 1 of language conversion table 13 to detect the position in the sequence in which a particular keyword is managed and searches data module 2 in accordance with detection information to identify the corresponding data and return it to multi-language conversion structure 18 as response data. If the provided keyword is not found in keyword module 1, default data 14, such as blank, is referred to multi-language conversion structure 18 as the conversion data. Multi-language conversion structure 18 then returns the corresponding data to data processing unit 11 as the response data. Screen display control unit 12 then displays this data on the display screen, thus completing the process.

Thus, as recited above, the present invention is characterized in that language conversion table 13 for managing the conversion relation between the keyword and the corresponding data is formed integrally with keyword module 1 and data module 2 in accordance with the respective language, and further characterized in that default data 14 is returned for use by the conversion request of a new keyword which is not subjected to the updating process. Therefore, the problem whereby an abnormal end of the program results because no corresponding data is returned is solved, and normal operation is guaranteed to perform the conversion function portion which has been run up to that point.

It also becomes possible to perform an updating of keyword module 1 and data module 2 for individual languages, thus adding a new keyword to an original position without heavily burdening the processing apparatus. Therefore, the present invention is extremely effective where the keyword cannot be changed and the problem of conversion capability of a keyword relating to a particular character deterioration, does not occur.

Figure 4:
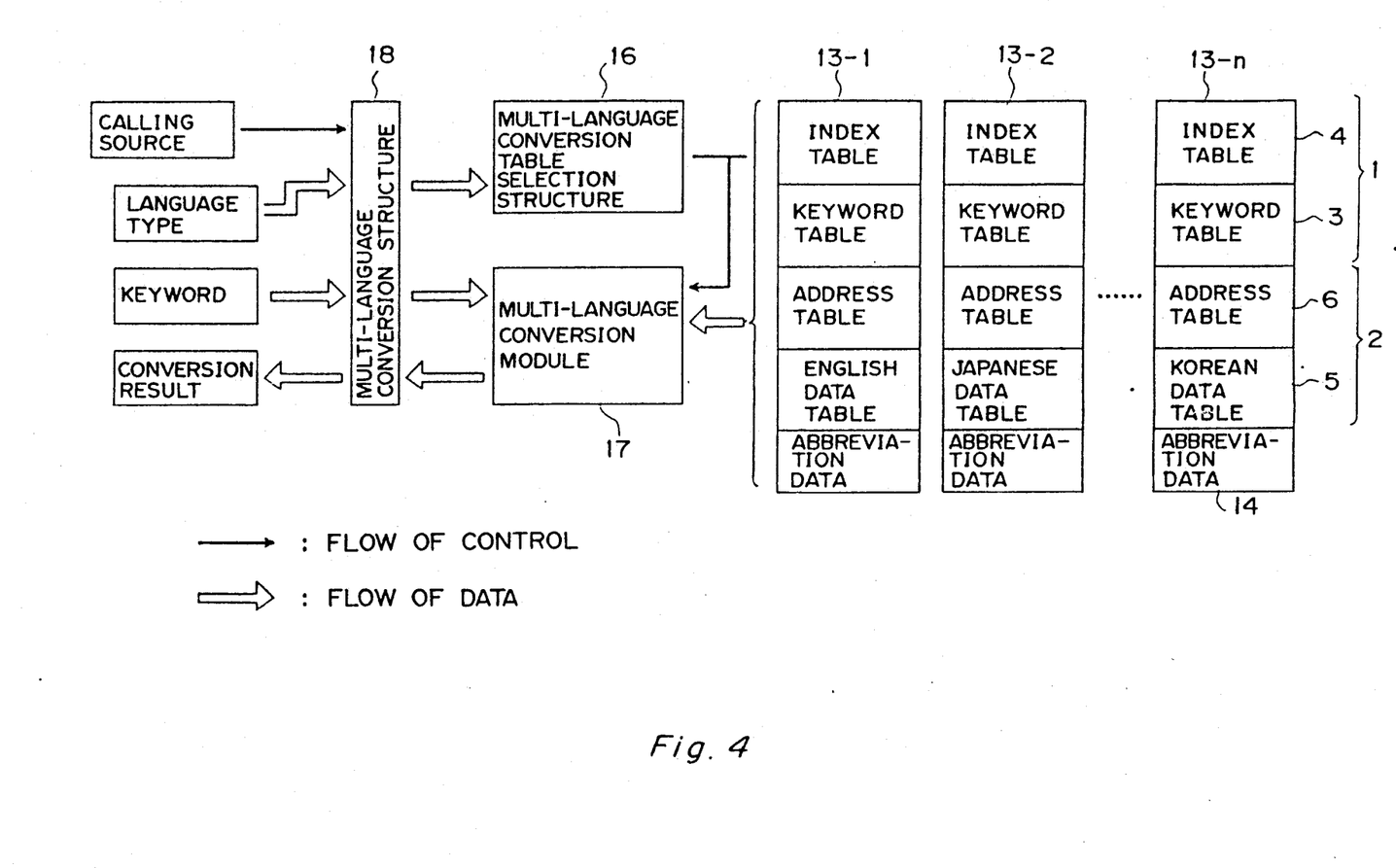
FIG. 4 shows a structural view of an embodiment of the present invention.

FIG. 4 shows an embodiment of the present invention. Parts which are identical to those in FIG. 3 are designated by same reference numbers. The present invention features an integral provision of keyword module 1 and data module 2 necessary for implementing a multi-language conversion. Namely, language conversion tables 13-1, 13-2 through 13-n for various languages is formed by providing keyword module 1 integrally with data module 2, thereby providing an English language conversion sub-table 13-1, a Japanese language conversion sub-table 13-2, and a Korean language conversion sub-table 13-n. Language conversion tables 13-1, 13-2 through 13-n comprise sub-tables, each corresponding to a specific language to be the subject of a conversion. Thus, the respective language conversion sub-tables also manage predetermined default data 14, such as "blank" symbols.

Forming one of the language conversion tables 13-1, 13-2 through 13-n by integrating keyword module 1 with data module 2 does not mean that keyword module 1 is managed in a format such that it is incorporated in a part of the data conversion structure unit as in the prior art, but that the data conversion structure unit is completely separated from the data portion.

Keyword module 1 provided in respective language conversion sub-tables 13-x, as in the prior art technology, comprises keyword table 3 for dividing the keyword in accordance with a graph of head characters, thus managing the keywords in incrementing order of head characters, and further comprises index table 4 for pointing to the head position of respective graphs of keyword table 3.

Module 2 provided in respective one of the language conversion tables 13-1, 13-2 through 13-n manages the corresponding data in accordance with the order of the keyword of keyword module 1. As in the prior art, keyword module 1 comprises keyword table 5 for managing the corresponding keyword data in the same order as in keyword table 3 and further comprises address table 6 for pointing to the corresponding data in data table 5.

The advantage of the above structure for language conversion tables 13-1, 13-2 through 13-n is explained below.

In accordance with the expansion of the function of the application program constituting a source for calling multi-language conversion structure 18, a new keyword is added as the keyword requested to be converted by the application program. In this case, a programmer adds the keyword to keyword module 1 in accordance with language conversion sub-table 13-1, 13-2, . . . of the respective languages and the corresponding data is added to individual data module 2. Namely, keyword module 1 is synchronized with data module 2 with regard to respective language conversion sub-tables 13-1, 13-2, . . . . Thus, it is unnecessary to simultaneously add new keyword information to data module 2 for all the provided language conversion sub-tables 13-1, 13-2, . . . . Thus, English language conversion sub-table 13-1 is updated first and then Japanese language conversion sub-table 13-2 is updated. Data module 2 of all of the language conversion tables 13-1, 13-2 through 13-n has to be updated simultaneously in the prior art. In contrast, in the present invention, data module 2 of language conversion sub-tables 13-1, 13-2, . . . may be updated separately for respective languages. Thus, the burden of use is reduced as a new keyword can be added to the original management position.

The integrated keyword module and data module 2 are a single pair. Thus, where the language conversion tables 13-1, 13-2 through 13-n subjected to the updating process are used, the corresponding data is naturally not returned to the application program. For example, the process of updating English language conversion sub-table 13-1 is ended but the process of updating Japanese language conversion sub-table 13-2 is not completed. In this case, if the Japanese language conversion sub-table 13-2 is used, the corresponding data is not returned to the application program Thus, the program is completed abnormally. In order to deal with such problems, when a language conversion tables 13-1, 13-2 through 13-n is requested to convert a keyword which is not found in keyword module 1, abbreviation data 14 is returned to the application program as if it were the corresponding data. Accordingly, default data 14, such as a blank, is displayed on a display screen and abnormal ending of the program is avoided.

The operation of the embodiment shown in FIG. 4 is explained by referring to FIG. 3 as recited above. The application program forming the source of the calling displays the corresponding data of the keyword described in the program on the display surface. The language type and keyword is provided to activate multi-language conversion structure 18, which then calls a multi-language conversion table and selection structure 16 by designating the provided language type. The multi-language conversion table selection structure 16 thus called reads language conversion sub-table 13-x of the designated language from among those in conversion table management unit 15, so that the language conversion table is used by multi-language conversion module 17.

Next, multi-language conversion structure 18 calls multi-language conversion module 17 by designating the provided keyword. Multi-language conversion module 17 then searches keyword module 1 of the set language conversion sub-table 13-x and detects the position of the designated keyword in the keyword sequence. Then, in accordance with the detection information, data module 2 is searched, and the corresponding data is determined and returned to multi-language conversion structure 18 as the response data. When the provided keyword, does not exist in keyword module 1, the default data 14 is returned to multi-language conversion structure 18 as the conversion data. Multi-language conversion structure 18 returns the corresponding data to data processing unit 11 as the response data and screen display control unit 12 displays the corresponding data thus received on the display screen, thereby completing the process.

Figure 5:
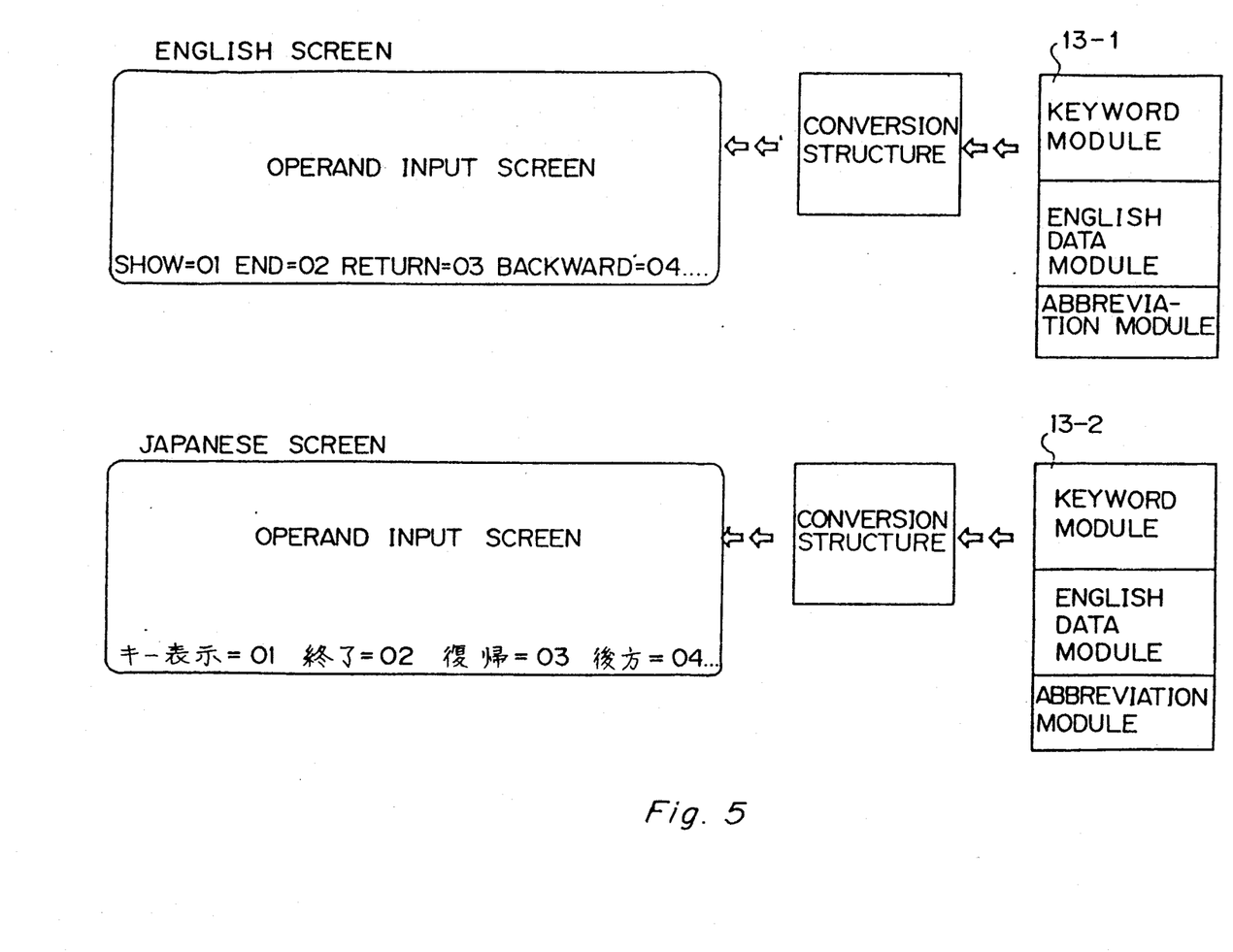
FIG. 5 shows an explanatory view of a display on a display screen.

FIG. 5 shows an example of a display of the display screen according to the present invention. As shown in FIG. 5, when English language conversion sub-table 13-1 is used, the keyword to be displayed is displayed in English and when Japanese language conversion sub-table 13-2 is used, the keyword to be displayed is displayed in Japanese.

Next, the above recited respective processes will be explained in detail, these processes being carried out in a system using a computer.

In the embodiment of data processing apparatus 10 shown in FIG. 3, the language conversion request is produced while the display request in display apparatus 20 is being carried out. The CPU then carries out a language conversion process, namely, a process for performing a multi-language conversion.

Figure 6:
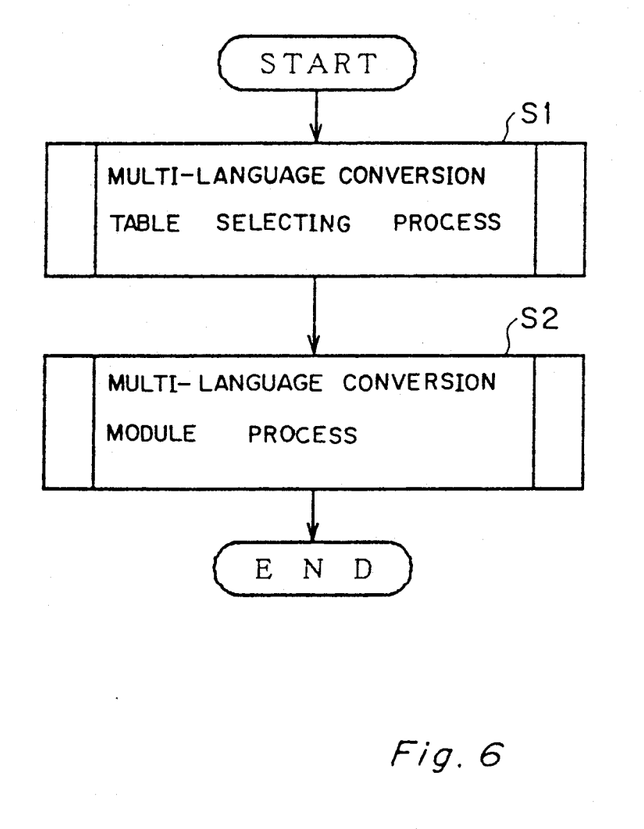
FIG. 6 shows a flowchart of a multi-language conversion process.

FIG. 6 shows a flowchart of a multi-language conversion process. At first, multi-language conversion table selection process S1 carries out the multi-language conversion table of the designating language type in a predetermined area.

Figure 7:
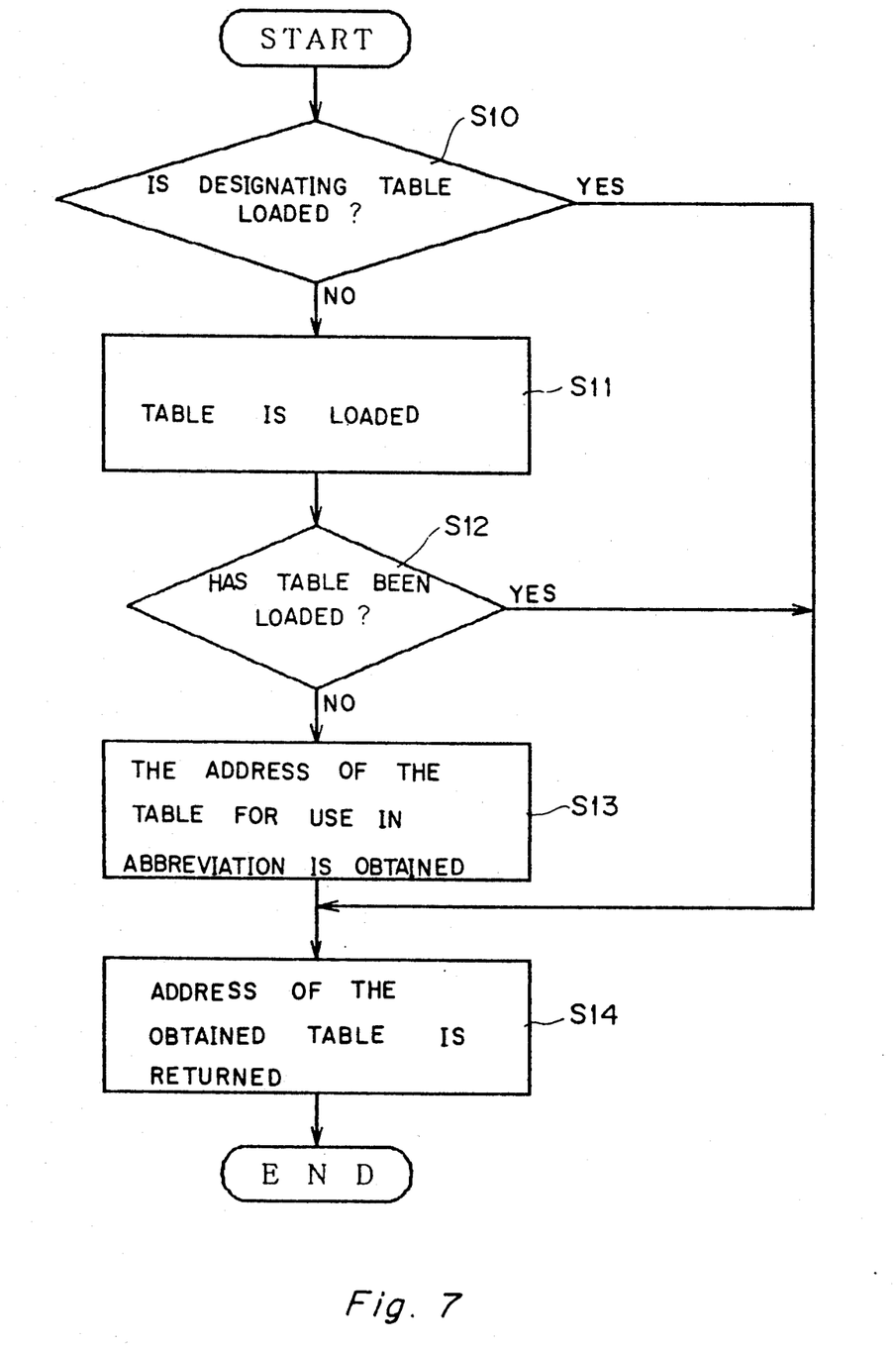
FIG. 7 shows a flowchart of a process for selecting a multi-language conversion table.

FIG. 7 shows a detailed flowchart of the multi-language conversion table selection process S1. In the first step (S10) of the execution process, it is judged whether or not the designated table is loaded. If it is not (NO), the process goes to load step (S11). Then it is judged at (S12) whether or not the table has been loaded. If it has not (NO), the address of the table to be used for abbreviation data is obtained (S13). If it is judged at step (S10) that the designated table is loaded (YES), then a conversion is carried out using the same language as in the previous conversion and the objective table is loaded in the previously determined area. When the table is judged as being loaded at S12, it is newly loaded. When the judgments are YES at S10 and S12, the address of the obtained table is returned to the following routine at S14. The address of the obtained table is, for example, the load address of a predetermined area as it differs depending on the system. It is returned or provided to the next routine at S14. On the other hand, when the judgments at S10 and S12 are NO, namely, when the designated table was not previously loaded or when it cannot be loaded, it does not exist. Therefore, the address of the table for the abbreviation is obtained at S13. Then, in the next process S14, the table address for the abbreviation is returned.

In selection process S1, as described above, the table address required for the multi-language conversion module process can be obtained. After carrying out process S1, multi-language conversion module process S2 is carried out. Multi-language conversion module process S2 performs language conversion by using the keyword and multi-language conversion table.

Figure 8:
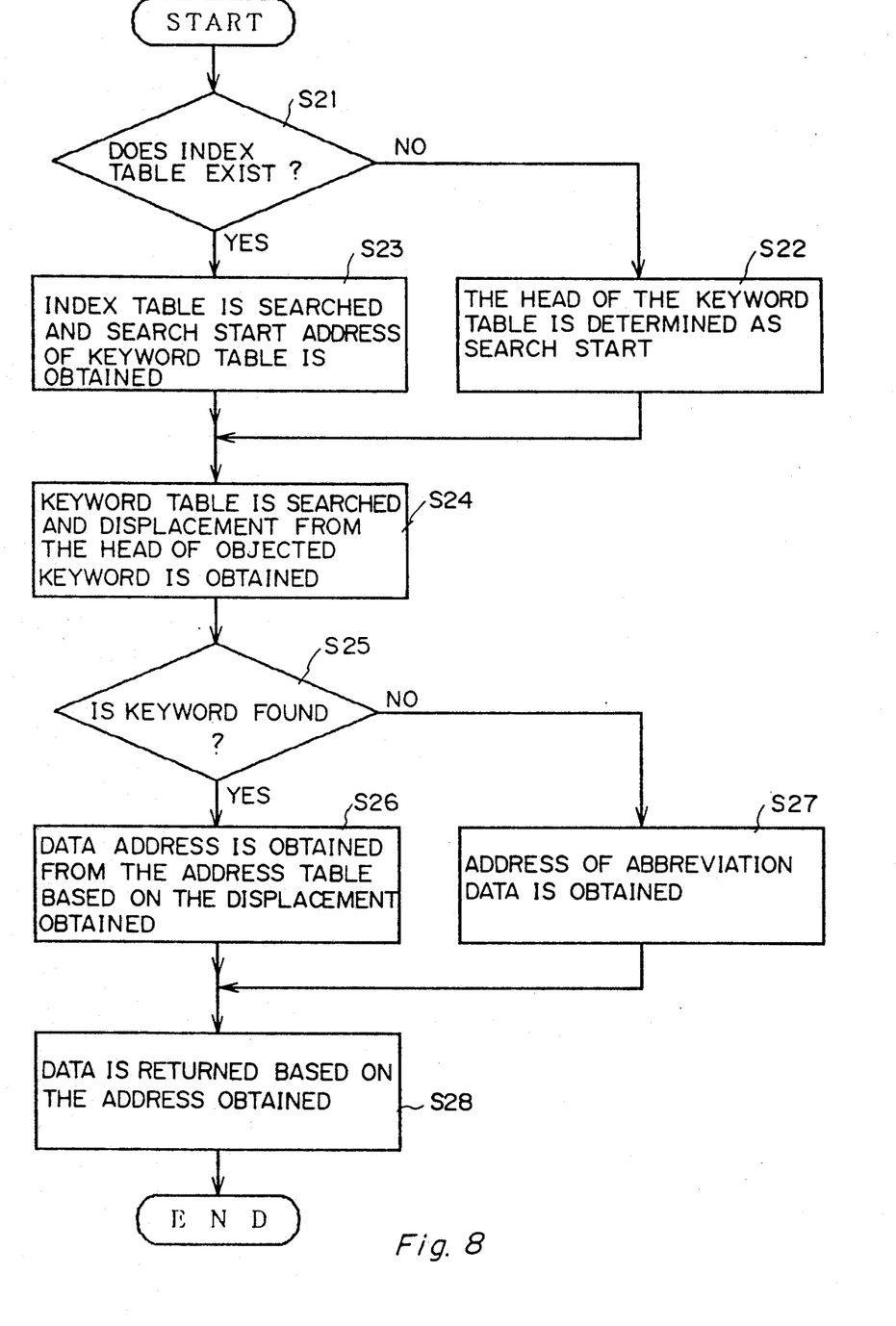
FIG. 8 shows a flowchart of a multi-language conversion module process.

FIG. 8 is a detailed flowchart of multi-language conversion module process S2. In the first step S21, it is judged whether or not an index table exists.

Figure 9A:
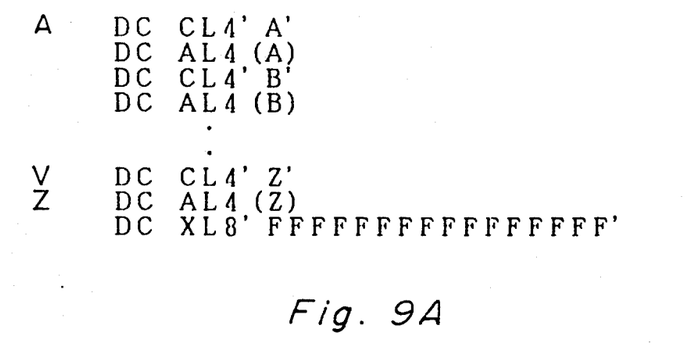
FIG. 9A shows a diagram of an index table.

One embodiment of the present invention provides for a system in which the index table does not exist in keyword module 1 and is sequentially searched. If the index INDX table does not exist (NO) at S21, the process in which the head of the keyword table is determined as the search start address, the search being carried out at S22. If it does (YES), it is searched to obtain the search start address of the keyword table at S23. The index table stores the head character of the corresponding keyword address as shown in the index table of FIG. 9A. Namely, a defined constant command (DC command) designates the head character (for example A) corresponding to respective characters and the head address for storing the head character. CL4 represents a character of 4 bytes. In the index table shown in FIG. 9A a key is represented by one character and A of one character is provided by the DC command of 4 bytes. Thereafter, the address of label A is provided with 4 bytes by AL4. The same matter is applied to characters B or C. These labels A . . . V, Z correspond to "ACCNT" "ACDTE" ... "VOLSER", and "ZPINS", and are provided for the respective head character. The addresses of these labels A to Z are shown in the index table diagram.

Figure 9B:
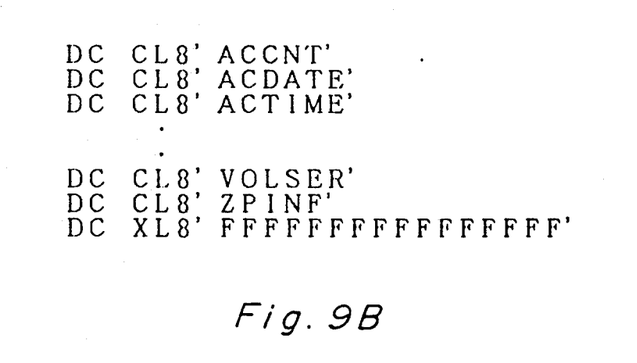
FIG. 9B shows a diagram of a keyword table.

At step 23, the head address of A is obtained from the index table. After S23 is executed, the keyword table shown in FIG. 9B is searched and a displacement from the head address of the objective keyword is obtained at S24. In the present embodiment, the keyword table is provided in units of 8 bytes and the displacement address is obtained by multiplying by 8. It is judged at S25 whether or not the keyword has been found by the search. When the keyword is not found (NO), the address of the default data is obtained at S27. If the keyword is found (YES), the address of the data is obtained from the address table shown in FIG. 9C based on the obtained displacement S24.

Figure 9C:
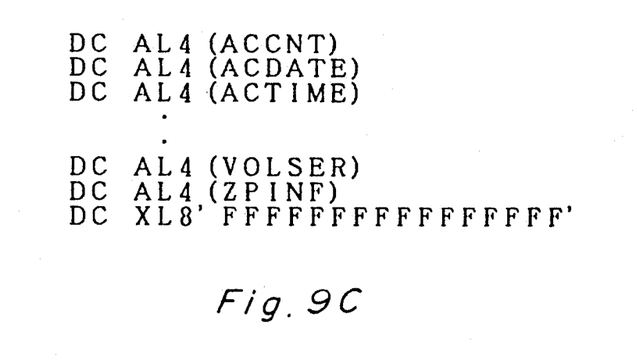
FIG. 9C shows a diagram of an address table.

In the present embodiment, the address is changed in units of 8 bytes in the keyword table but the address table is changed in units of 4 bytes as shown in FIG. 9C. The above displacement is used to obtain the number of bytes of the addresses in which the keyword exists and the position of the address table can be thereafter obtained based on this number. For example, if the Japanese expressed by the characters ACTIME is obtained, then ACTIME is stored at the third position of the keyword table and the address is obtained as the third position of the address table from the third position of the keyword table and then stored in the address table. In the present embodiment, an index table and a keyword table are provided as the keyword module. The address table and data table are provided as a multi-language data module for respective languages. In addition to 4 tables, an abbreviation data address is provided for respective languages. If it is judged at S25 that the keyword is not found at S25, then the address of the abbreviation data is obtained at S27. At S28, the data is returned based on the addresses obtained through steps S26 or S27. Thereafter, multi-language conversion module S2 is executed, thereby increasing the conversion speed.

Figure 9D:
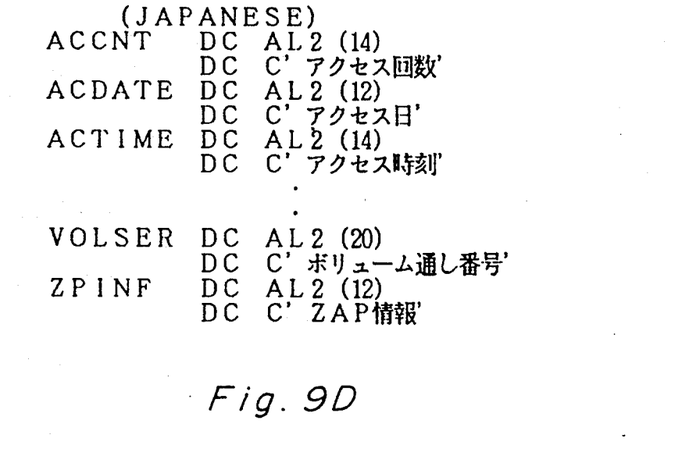
FIG. 9D shows a diagram of a data table (Japanese)
Figure 9E:
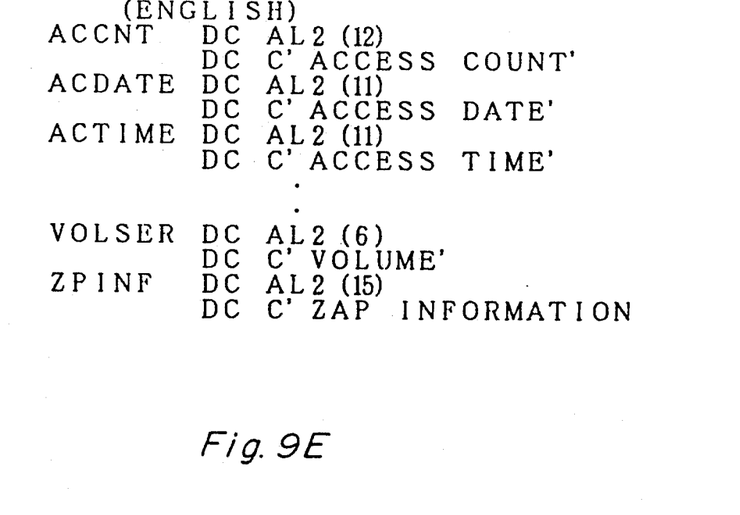
FIG. 9E shows a diagram of a data table (English).

The above processing is explained in detail by referring to FIGS. 9D and 9E. Where the request for a display such as ACTIME is produced in the data process apparatus, the head address A is obtained from the index table and ACTIME is sequentially searched from the head address to determine that "ACTIME" is the third character from the keyword table. Then by referring to the third address table, the address in which the data is stored is obtained. From "ACTIME", "ACCESS TIME" is obtained in English and          is obtained in Japanese. The attributes of respective characters are also stored as information in the data table and can be used simultaneously in the display process in the data process apparatus. 8 FF's (H) are provided at the last portions of the index table 4, keyword table 3 and address table 6 to express the last address. Therefore, 8 other FF's (H) are detected during a search process and the end of the table can be designated.

As described above, according to the present invention, the keyword module (index table, table word table) and multi-language data module (address table, data table) are provided for individual languages. Thus, it is possible to update the data because individual languages of the updating process are delayed. Updating is not yet registered when such data is dealt with as default data. Thus, even in the table in which the updating process is delayed, unnecessary data is not displayed.

In the embodiment of the present invention, index table, keyword table and address table may be made common for individual languages whenever they are updated.

In addition to being used in a data process apparatus as described above, the present invention can be used in a device in which the display is performed by converting the display to respective languages.

As explained in detail above, the present invention provides a multi-language conversion process for converting the keyword recited in the data process program into corresponding data of the designating language in which, even if new key data is added in accordance with an expansion of the function of the program , the abnormal end of the program conventionally caused when the corresponding data is not returned, is avoided and normal operation is guaranteed with regard to the conversion function portion which has been run up to that point. Further, without imparting a great burden, a new keyword can be added to the original position. Thus, the present invention is extremely useful where the keyword name cannot be changed. Further, the problem whereby the conversion capability of a keyword relating to a predetermined character is lowered is also prevented.

What is claimed is:

1. A multi-language conversion system for converting an input keyword to output language data in accordance with a language designation, comprising:

a multi-language conversion table comprising a plurality of language conversion sub-tables, each of said language conversion sub-tables including a keyword module for storing keyword data in a fixed order, a language data module for storing language data which corresponds to the keyword data and is stored in the same fixed order as the keyword data, and a default data module for storing predetermined default data which does not correspond to the keyword data, and language conversion sub-table selection means for selecting a designated one of said language conversion sub-tables in accordance with the language designation, language conversion means for searching the keyword module in the fixed order to determine whether the input keyword exists at a location in the fixed order of the keyword data, for retrieving from the language data module the language data at a corresponding location of the same fixed order to produce the output language data when the input keyword exists in the keyword data, and for retrieving default data from the default data module to produce the output language data when the input keyword does not exist in the keyword data and Means for updating keyword modules by appending new words at an end of the fixed order of some but not necessarily all of the plurality of language sub-tables and corresponding keyword modules such that when said language conversion means searches a keyword module in the fixed order, the new words are searched for last and when said language conversion means determines that the input keyword does not exist, the input keyword has not been appended as a new word and the default data is retrieved from the default data module to produce the output language data.

2. A multi-language conversion system according to claim 1, further comprising display means for displaying the output language data at a predetermined one of a plurality of locations on the display means.

3. A multi-language conversion process system according to claim 2,
wherein said default data module stores the default data comprising a blank code, and
wherein said language conversion means produces the blank code from said default data module for representing a blank on said display means.

4. A multi-language conversion process system according to claim 3, wherein said keyword module comprises
a keyword table for storing keyword data having head characters in the fixed order, and
an index table for storing an index address corresponding to locations of the head characters of the keyword data in the keyword table.

5. A multi-language conversion system according to claim 4, wherein said language data module comprises
a language data table for storing the language data, and
an address table for storing an address corresponding to locations of the language data in said language data table in accordance with the fixed order of the keyword data in the keyword table.

6. A multi-language conversion process system according to claim 1, wherein said keyword module comprises
a keyword table for storing the keyword data having head characters in the fixed order, and
an index table for storing an index address corresponding to locations of the head characters of the keyword data in the keyword table.

7. A multi-language conversion system according to claim 6, wherein said language data module comprises
a language data table for storing the language data, and
an address table for storing an address corresponding to locations of the language data in said language data table in accordance with the fixed order of the keyword data in the keyword table.

8. A multi-language conversion system according to claim 1, wherein said language data module comprises
a language data table for storing the language data, and
an address table for storing an address corresponding to locations of the language data in said language data table in accordance with the fixed order of the keyword data in the keyword table.

9. A multi-language conversion system according to claim 1,
wherein said language conversion sub-table selection means comprises
a memory, and
means for loading into a predetermined area of said memory a designated language conversion sub-table in accordance with the language designation, and
wherein said language conversion means comprises means for obtaining the output language data from the predetermined area of said memory.

* * * * *

UNITED STATES PATENT AND TRADEMARK OFFICE
CERTIFICATE OF CORRECTION

PATENT NO. : 5,157,606
DATED      : October 20, 1992
INVENTOR(S): HIRONOBU NAGASHIMA It is certified that error appears in the above-indentified patent and that said Letters Patent is hereby corrected as shown below:

Col. 8, line 6 insert --  --
after "and".

Signed and Sealed this

Twenty-sixth Day of April, 1994

*Attest:*

BRUCE LEHMAN

*Attesting Officer*   Commissioner of Patents and Trademarks